United States Patent [19]

Komossa

[11] Patent Number: 4,615,343
[45] Date of Patent: Oct. 7, 1986

[54] DEVICE FOR COMPRESSING TOBACCO IN TOBACCO COMMINUTING MACHINES

[75] Inventor: Werner Komossa, Börnsen, Fed. Rep. of Germany

[73] Assignee: Hauni-Werke Körber & Co. KG., Hamburg, Fed. Rep. of Germany

[21] Appl. No.: 645,438

[22] Filed: Aug. 29, 1984

[30] Foreign Application Priority Data

Sep. 3, 1983 [DE] Fed. Rep. of Germany ....... 3331917

[51] Int. Cl.$^4$ .............................................. A24B 7/04
[52] U.S. Cl. .................................. 131/111; 131/117; 198/851; 198/853; 198/957
[58] Field of Search ................. 29/DIG. 73; 198/957, 198/853, 851; 131/111, 117

[56] References Cited

U.S. PATENT DOCUMENTS 2,954,113  9/1960  Hibbard et al. .................... 198/851
3,202,266  8/1965  Schmermund ...................... 131/117
4,220,052  9/1980  Sheldon ............................... 198/853

Primary Examiner—V. Millin
Attorney, Agent, or Firm—Peter K. Kontler

[57] ABSTRACT

Each tobacco compacting chain of a tobacco shredding machine has several rows of block-shaped synthetic plastic links which are articulately connected to each other by transversely extending metallic pins receiving motion directly from the teeth of several coaxial sprocket wheels. The links form several endless rows, one for each sprocket wheel, and the links of neighboring rows are staggered relative to each other. Each pin extends through a pair of coaxial annular bearing elements at the inner side of one link in each of the rows and the end portions of the pins carry caps which are held thereon by screws and serve to hold the links against movement in the longitudinal direction of the respective pins.

11 Claims, 2 Drawing Figures

DEVICE FOR COMPRESSING TOBACCO IN TOBACCO COMMINUTING MACHINES

BACKGROUND OF THE INVENTION

The present invention relates to machines for comminuting tobacco, and more particularly to improvements in devices which are used to compress or compact tobacco in tobacco shredding machines. Still more particularly, the invention relates to improvements in chain conveyors which are used in tobacco compacting devices to convert tobacco leaves and/or fragments of tobacco leaves into a cake which is thereupon severed to yield tobacco shreds.

It is well known to equip a tobacco shredding machine with a compacting device wherein two endless chain conveyors converge to define a progressively narrowing channel for advancement of tobacco leaves toward the cutting station where the leader of the thus obtained tobacco cake is severed by one or more orbiting knives. The upper reach of the lower chain and the lower reach of the upper chain flank the channel and serve to entrain the tobacco leaves toward the severing station with simultaneous compacting of leaves to form the aforementioned cake. One of the chains can also serve as a counterknife in that it cooperates with the orbiting knife or knives in conversion of the leader of the cake into shreds.

The chains of tobacco compacting devices in tobacco shredding machines are subjected to highly pronounced stresses including bending and tensional stresses, to pronounced wear, as well as to contamination by certain constituents (especially the liquid constituents) of tobacco leaves. The liquid constituents penetrate into the spaces between the relatively movable parts of the chains. Attempts to avoid such undesirable influences and/or to avoid or eliminate the adverse effects of such influences include the making of extremely heavy, bulky and complex chains which should stand long periods of wear by being supposed to withstand the developing bending, tensional and/or other stresses.

As a rule, the front ends of the two endless chains which constitute component parts of the tobacco compacting or condensing device are adjacent to the respective portions of a mouthpiece through which successive increments of the cake advance into the range of the orbiting knife or knives of the shredding machine. The chains and the respective portions of the mouthpiece define narrow gaps which are barely sufficient to prevent frictional engagement between the chains and the mouthpiece but should not be wide enough to allow for penetration of larger particles of tobacco which could result in jamming of the conveyors and in mechanical damage to the parts of the compacting device. The gaps between the chains and the respective portions of the mouthpiece should be extremely narrow, normally in the range of a few tenths of one millimeter. In heretofore known tobacco shredding machines, the width of the just discussed gaps must be adjusted at rather frequent intervals due to pronounced wear upon the chains, especially in the regions where the chains are engaged by and receive motion from sprocket wheels. Thus, as the wear upon the chain parts which are driven by the sprocket wheels increases, the radii of curvature of the outer sides of the chain portions which are trained over the sprocket wheels and are adjacent to the respective portions of the mouthpiece also increase with the result that the gaps become wider and allow large particles of tobacco particles to penetrate thereinto.

OBJECTS AND SUMMARY OF THE INVENTION

An object of the invention is to provide a novel and improved tobacco compacting device for use in tobacco shredding and like machines.

Another object of the invention is to provide a novel and improved chain for use in the tobacco compacting device.

A further object of the invention is to provide a chain which is subject to less pronounced wear than heretofore known chains and which can be used as a superior substitute for conventional tobacco compacting and advancing chains in tobacco shredding and like machines.

An additional object of the invention is to provide a novel and improved chain conveyor which embodies the above outlined chain.

A further object of the invention is to provide a relatively simple, lightweight and inexpensive chain which is constructed and assembled in such a way that it can maintain the width of the gap between its front end and the respective portion of the mouthpiece at a constant value for surprisingly long intervals of time.

Still another object of the invention is to provide a novel and improved mode of transmitting motion from one or more sprocket wheels to the links or blocks of an endless chain for use in tobacco compacting devices.

An additional object of the invention is to provide a tobacco comminuting machine which embodies one or more chains of the above outlined character.

The invention resides in the provision of a combination of elements including at least one driven toothed sprocket wheel and an endless chain for compacting tobacco in a tobacco comminuting machine. The chain comprises a plurality of synthetic plastic links and metallic pins which not only connect the links to each other but are also directly engageable by the teeth of the sprocket wheel or wheels to move the chain along an endless path. The links are preferably formed with annular bearing portions which are traversed by the pins, i.e., through which the pins extend transversely of the direction of movement of the chain. The inner sides of the links (i.e., those sides which face the sprocket wheel or wheels during travel therearound), have recesses which afford access to the teeth of the sprocket wheel or sprocket wheels into direct engagement with the respective pins.

The links preferably form at least two endless rows and each thereof has a front and a rear pin-receiving hole extending transversely of the chain. The links of one of the rows are staggered with reference to the links of the other row in such a way that a pin which extends through the front hole of a given link in one of the rows extends through the rear hole of a first link in the other row and a pin which extends through the rear hole of the given link in the one row extends through the front hole of a second link in the other row. The width of the chain equals or approximates the length of a metallic pin.

The means for holding the links against movement longitudinally of the respective pins preferably includes caps which are applied to the end portions of the pins and screws passing through the caps and into tapped bores which are provided in the end faces of the pins.

The tobacco-contacting outer sides of the links can be provided with flutes which extend transversely of the chain and promote the transport of tobacco toward the severing station.

The conveyor which includes the improved chain preferably comprises several coaxial sprocket wheels, one for each row of links. Each link of such a chain is preferably formed with a pair of coaxial annular bearing elements at its front end, with a pair of coaxial annular bearing elements at its rear end, and with a recess between each pair of bearing elements. Such recesses and bearing elements are provided at the inner side of the respective link. As mentioned above, the links in the neighboring rows are preferably staggered relative to each other, and each pin passes through two coaxial bearing elements of a link in each of the rows. The width of each recess at least matches the axial length of a tooth on the respective sprocket wheel so that the teeth of the sprocket wheels can penetrate into the recesses and into direct engagement with the metallic pins. Each of the links can constitute a solid block consisting of a suitable wear-resistant lightweight synthetic plastic material.

The novel features which are considered as characteristic of the invention are set forth in particular in the appended claims. The improved chain conveyor itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
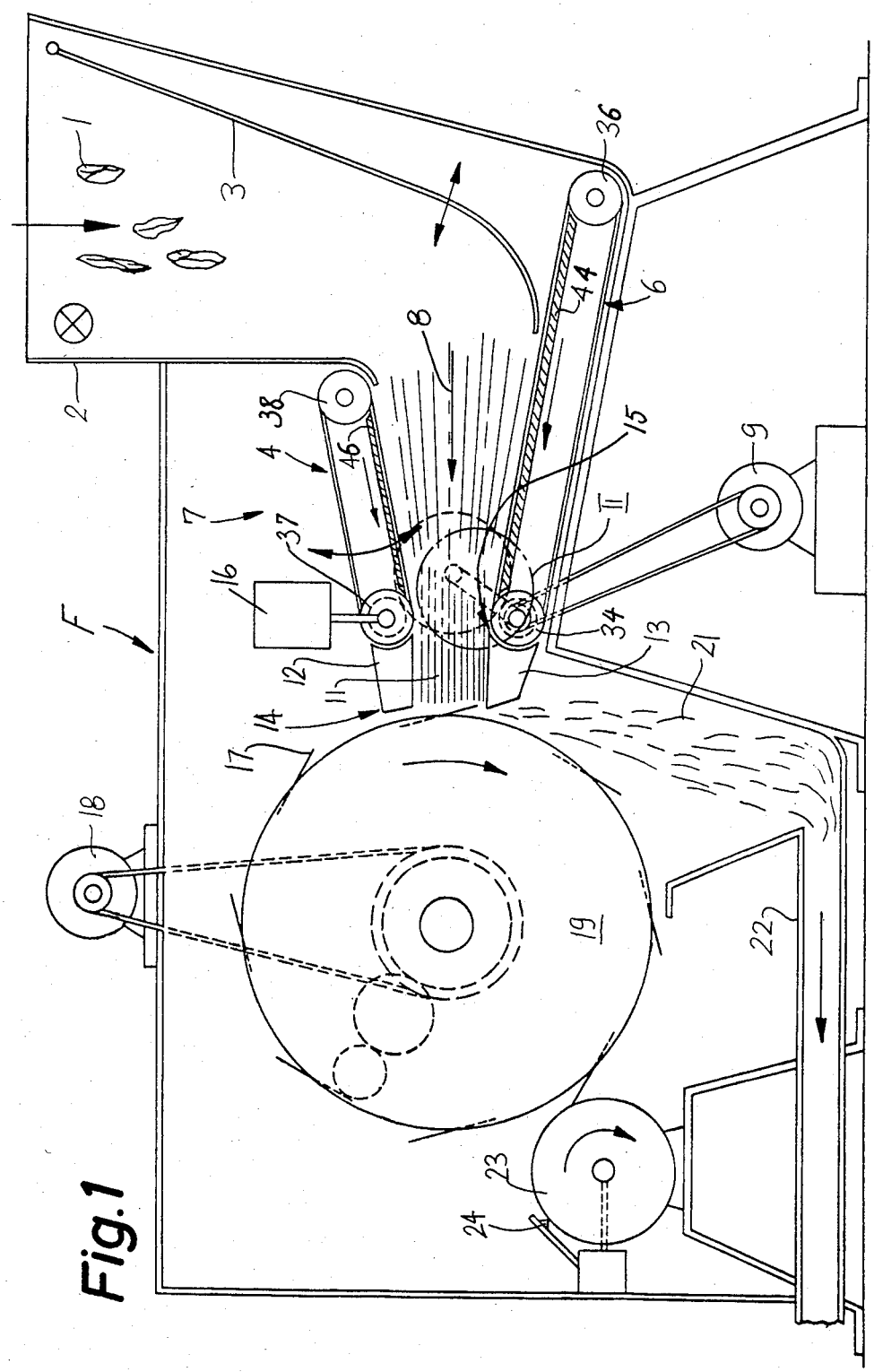
FIG. 1 is a schematic partly elevational and partly longitudinal vertical sectional view of a tobacco shredding machine embodying two endless chains which are constructed in accordance with the invention.

Referring first to FIG. 1 there is shown a tobacco shredding machine which serves to convert tobacco leaves 1 or portions of tobacco leaves into shreds 21. The machine comprises a frame or housing F the rear portion of which supports an upright duct 2 containing a pivotable rake 3 and receiving tobacco leaves 1 from a suitable conveyor, not shown. The directions in which the rake 3 is pivoted back and forth are indicated by a double-headed arrow. The manner in which the duct 2 can receive tobacco from a conveyor is disclosed, for example, in commonly owned U.S. Pat. No. 4,172,515 granted to Wochnowski. The manner of pivoting the rake 3 is disclosed, for example, in commonly owned U.S. Pat. No. 4,149,547 granted to Komossa etal.

The rake 3 delivers tobacco leaves onto the upper reach of a lower endless tobacco compacting chain 6 which is constructed and cooperates with a set 34 of coaxial sprocket wheels 39 in accordance with one embodiment of the present invention. The upper reach of the lower chain 6 cooperates with the lower reach of a similar or analogous endless chain 4 in such a way that the mutually inclined upper and lower reaches of the chains 6 and 4 convert the delivered tobacco leaves 1 into a cake 11 which advances in the direction indicated by the arrow 8, namely toward and between the upper and lower portions 12, 13 of a mouthpiece 14 which is disposed at the discharge end of the channel between the chains 4 and 6. The chains 4 and 6 constitute two components of a tobacco compacting unit 7 which delivers successive increments of the cake 11 into the range of orbiting knives 17 on a rotary drum-shaped knife holder 19. The set 34 of sprocket wheels 39 for the lower chain 6 is driven by an electric motor 9, and the holder 19 is driven by a second electric motor 18.

The portions 12, 13 of the mouthpiece 14 and the adjacent portions of the respective upper and lower chains 4, 6 define arcuate clearances or gaps 15 each having a width which is a fraction of one millimeter, preferably 0.6 mm. It is highly desirable and advantageous to ensure that the width of the gaps 15 remains unchanged or varies only little because this prevents penetration of tobacco particles between the portions 12, 13 of the mouthpiece 14 and the respective chains 4, 6 and eventual jamming and/or other damage to the chains and/or mouthpiece. The establishment of a gap 15 which remains at least substantially unchanged is particularly important in the region between the lower chain 6 and the respective portion 13 of the mouthpiece 14.

The front portion of the upper chain 4 is acted upon by a biasing device 16 which urges the set 37 of sprocket wheels for the chain 4 downwardly to thus ensure that the density of the cake 11 in the region of the mouthpiece 14 will remain within an optimum range. The set 37 of sprocket wheels for the upper chain 4 receives torque from the set 34 of sprocket wheels 39 for the lower chain 6 through the medium of a system of gears or the like. The rear portion of the lower chain 6 is trained over a smooth-surfaced roller 36, and the rear portion of the upper chain 4 is trained over a smooth-surfaced roller 38. When the biasing device 16 causes or allows the set 37 of sprocket wheels to descend or to rise, the entire upper chain 4 pivots about the axis of the roller 38. To this end, the shaft for the set 37 of sprocket wheels is mounted in a frame which is pivotable about the axis of the roller 38.

The lower portion 13 of the mouthpiece 14 constitutes a stationary counterknife for successive knives 17 on the rotating holder 19. The cutting edges of the knives 17 are sharpened by a driven grinding wheel 23 whose working surface is treated by a diamond 24 or another suitable dressing tool. The shreds 21 which are formed by the knives 17 in cooperation with the counterknife 13 are caused or allowed to descend into a pneumatic conveyor 22 for transport to the next station, e.g., into the hopper of the distributor in a cigarette making machine.

Figure 2:
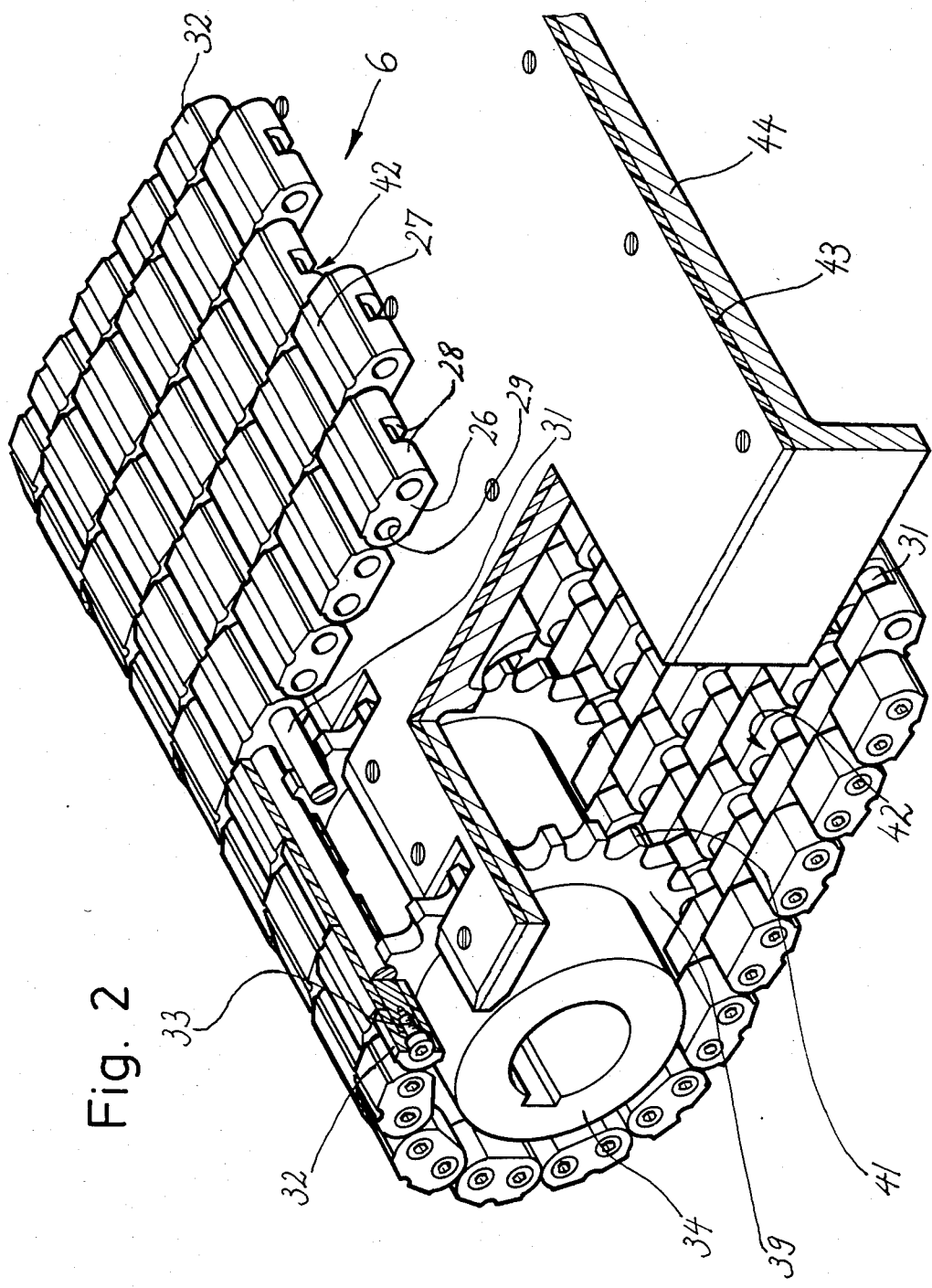
FIG. 2 is an enlarged fragmentary perspective view (within the phantom-line circle II of FIG. 1) of one of the chains, further showing two of the sprocket wheels and the support for the upper reach of the chain.

The construction of the upper chain 4 is or can be identical with that of the lower chain 6. A portion of the chain 6 is shown in greater detail in FIG. 2 which further shows a plastic platform 43 for the tobacco-engaging upper reach of the conveyor 6. The platform 43 is affixed to a rigid metallic support 44 which is mounted in the frame F of the shredding machine. The platform for the lower reach of the upper chain 4 is shown in FIG. 1, as at 46.

The chain 6 comprises several endless rows of substantially block-shaped solid synthetic plastic chain links 26 each of which has a tobacco-contacting outer side provided with one or more transversely extending flutes 27, grooves, channels or analogous depressions to ensure more predictable entrainment of tobacco leaves 1 in the channel between the conveyors 4 and 6.

The underside of each link 26 is formed with a pair of coaxial front bearing elements 28 in the form of annuli which are separated by a recess 42 and a pair of coaxial rear bearing elements 28 in the form of annuli which are also separated from each other by a recess 42. The annuli 28 of each pair have coaxial bores or holes 29 for relatively strong elongated metallic chain pins 31. The links 26 of neighboring rows of links are staggered relative to one another in such a way that a pin 31 which passes through the front annuli 28 of a link 26 in one of the rows passes through the rear annuli 28 of the links in the two neighboring rows. In other words, the front annuli of each link 26 in a given row between two neighboring rows are in register with the rear annuli of a first link in each of the neighboring rows, and the rear annuli 28 of the same given link 26 are in register with the front annuli 28 of a second link in each of the neighboring rows. Such staggered or nested formation of links 26 can be readily seen in FIG. 2. The diameters of the metallic pins 31 are relatively large, and the width of the recesses 42 between the pairs of annuli 28 suffices to allow for penetration of teeth 41 on the respective sprocket wheels 39 of the set 34. Thus, the teeth 41 of the respective sprocket wheels 39 directly engage the pins 31 between the pairs of annuli 28 in the corresponding rows of links 26 so that the wear upon the plastic links 26 is much less pronounced than in conventional chains. The length of each pin 31 matches or is slightly less than the width of the chain 6.

The means for holding the links 26 against movement longitudinally of the respective pins 31 comprises plastic or metallic caps 32 which are applied over the respective end portions of the pins 31, and screws 33 whose heads are recessed into the respective caps 32 and whose shanks extend into tapped bores in the end faces of the corresponding pins 31.

The sprocket wheels 39 are relatively narrow and their number preferably matches the number of endless rows of links 26.

The platform 43 is in contact with the inner sides of the links 26 while such links form part of the upper reach of the chain 6. Therefore, progressing wear upon the inner sides of the links 26 cannot influence the width of the gap 15 between the chain 6 and the lower portion 13 of the mouthpiece 14 because the teeth 41 of the sprocket wheels 39 engage directly with the pins 31. The diameter of the pitch circle of each sprocket wheel 39 remains unchanged and, since the wear upon the outer sides of the links 26 is negligible (such outer sides are contacted only by the tobacco leaves 1), the width of the gap 15 remains unchanged for surprisingly long intervals of time. This reduces the number and the duration of periods of dwell and thus contributes to higher output of the shredding machine. Thus, once the width of the gap 15 between the chain 6 and the portion 13 of the mouthpiece 14 is adjusted, it remains unchanged for long periods of time.

The predominantly liquid constituents of tobacco leaves 1 which are squeezed out of the respective leaves during travel in the channel between the mutually inclined upper and lower reaches of the chains 6 and 4 are free to escape between the links 26 as well as through the gap 15 between the chain 6 and the lower portion 13 of the mouthpiece 14. Such liquid constituents cannot settle on the teeth 41 and/or on the pins 31 because the teeth 41 repeatedly engage the oncoming pins 31 so that the set 34 of sprocket wheels 39 and the links 26 perform an automatic self-cleaning action. Moreover, and as mentioned above, the width of the flanks of teeth 41 (as considered in the axial direction of the sprocket wheels 39) is extremely small which also reduces the likelihood of accumulation of incrustated juice and/or other foreign matter that could interfere with the operation of the compacting unit 7. Such expulsion of foreign matter from the regions of engagement between the teeth 41 and the pins 31 is highly desirable and advantageous because it does not increase the radius of curvature of that portion of the chain 6 which travels around the set 34 of sprocket wheels 39, i.e., the width of the gap 15 between the chain 6 and the lower portion 13 of the mouthpiece 14 is not increased. Such narrowing of the gap 15 between the parts 6 and 13 could lead to jamming by solid particulate material.

An important advantage of the improved chains and of the conveyors which employ such chains is that the relatively large and highly wear- and flexure-resistant metallic pins 31 are directly engaged by the relatively narrow teeth 41 of the sprocket wheels 39 so that the links can be made of a lightweight material, preferably a synthetic plastic material, because they are not directly engaged by the sprocket wheels.

Another important advantage of the improved chains is that the wear at the inner sides of their links 26 is of no consequence insofar as the width of the gaps 15 is concerned because the transmission of motion from the prime mover 9 to the chain links 26 takes place by way of metallic pins 31 which are directly engaged by the teeth 41. Therefore, the wear upon the inner sides of the links 26 does not have any influence upon the radius of curvature of the arcuate path along which the outer sides of the chain links 26 advance around the set 34 of sprocket wheels 39.

The provision of circumferentially complete annular bearing elements 28 at the inner sides of the links 26 contributes to stability of the links and to the ability of the improved chains to stand pronounced tensional and bending stresses. The area of contact between each pin 31 and the respective links 26 is large so that the pressure per unit area of those surfaces of the links 26 which are contacted by the pins 31 is rather low, i.e., the transmission of forces from the pins 31 to the links 26 is highly satisfactory and of such nature as to ensure longer useful life of the links.

The utilization of relatively narrow teeth 41 and large-diameter pins 31 also contributes to a highly satisfactory self-cleaning effect which prevents undue increase of the radius of curvature of the aforementioned path and the resulting narrowing of the respective gap 15. The magnitude of forces acting between the narrow teeth 41 and the pins 31 is pronounced and invariably suffices to keep the flanks of teeth 41 and the peripheral surfaces of the pins 31 (in the regions of the recesses 42) clean with the aforediscussed beneficial results insofar as the self-cleaning action is concerned.

The nesting of neighboring links as a result of staggering of links in neighboring rows of the improved chains contributes to sturdiness of the chains, to highly satisfactory flexibility and to longer useful life.

All in all, the improved chains have been found to be simpler and less expensive than heretofore known chains and to be capable of standing longer periods of uninterrupted use. Moreover, the useful life of the links 26 is much longer than that of links which are used in conventional chains. The links 26 can be mass-produced at a low cost in available machines. Since the weight of the improved chains is a fraction of the weight of conventional chains with metallic links, the improved chains can be installed in or removed from a shredding machine with little loss in time. Additional savings in time are achieved due to less frequent need for maintenance work and adjustment of the width of the gaps 15. This contributes to higher output of the machine.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. The combination of at least one driven toothed sprocket wheel with an endless chain for compacting tobacco in a tobacco comminuting machine, said chain comprising a plurality of plastic links and metallic pins connecting said links to each other and being directly engageable by the teeth of said sprocket wheel, said links having inner sides facing said sprocket wheel during travel therearound and said inner sides having recesses affording access to the teeth of said sprocket wheel into direct engagement with the respective pins.

2. The structure of claim 1, wherein said links have annular bearing portions which are traversed by said pins.

3. The structure of claim 1, wherein said links form at least two endless rows and each thereof has a front and a rear pin-receiving hole extending transversely of the chain, the links of one of said rows being staggered with reference to the links of the other of said rows so that a pin which extends through the front hole of a given link in said one row extends through the rear hole of a first link of said other row and a pin which extends through the rear hole of said given link extends through the front hole of a second link of said other row.

4. The structure of claim 1, wherein the width of said chain approximates or equals the length of said pins.

5. The structure of claim 1, wherein each of said pins has two end portions and further comprising means for holding said links against movement longitudinally of the respective pins, said holding means including caps provided on the end portions of said pins and screws passing through said caps and axially into the respective end portions.

6. The structure of claim 1, wherein each of said links has a tobacco-contacting outer side and at least one flute provided in the outer side and extending in substantial parallelism with said pins.

7. The structure of claim 1, wherein each of said links is a solid block having a front and a rear pair of annular bearing elements.

8. The combination of a plurality of coaxial driven toothed sprocket wheels with an endless chain for compacting tobacco in a tobacco comminuting machine, said chain comprising a plurality of plastic links and metallic pins connecting said links to each other and being directly engageable by the teeth of said sprocket wheels, said links forming a plurality of neighboring endless rows, one for each of said sprocket wheels, and each of said links having an inner side having a front end, a rear end, a pair of coaxial annular bearing portions at said front end, a pair of coaxial annular bearing portions at said rear end and a recess between each pair of bearing portions, the links of neighboring rows being staggered with reference to each other and each of said pins extending through a pair of coaxial bearing portions of one link of each of said rows.

9. The structure of claim 8, wherein said links have inner sides facing said sprocket wheels during travel therearound, said inner sides having recesses affording access to the teeth of said sprocket wheels into direct engagement with the respective pins.

10. The structure of claim 9, wherein the width of said recesses at least matches the axial length of teeth on the respective sprocket wheels so that the teeth of such sprocket wheels can penetrate into the recesses and into engagement with the pins.

11. The combination of at least one driven toothed sprocket wheel which an endless chain for compacting tobacco in a tobacco comminuting machine, said chain comprising a plurality of plastic links and metallic pins connecting said links to each other and being directly engageable by the teeth of said sprocket wheel, each of said pins having two end portions and further comprising means for holding said links against movement longitudinally of the respective pins, said holding means including caps provided on the end portions of said pins and screws passing through said caps and axially into the respective end portions.

* * * * *